United States Patent
Kang et al.

(10) Patent No.: US 6,840,198 B2
(45) Date of Patent: Jan. 11, 2005

(54) AIR-PROPORTIONALITY TYPE BOILER

(75) Inventors: Sin Gu Kang, Pyungtaek-Shi (KR); Byung Hee Kang, Cheonan-Shi (KR)

(73) Assignee: Kyungdong Boilor Co., Ltd., Gyonggi-Do (KR)

( * ) Notice: Subject to any disclaimer, the term of this patent is extended or adjusted under 35 U.S.C. 154(b) by 0 days.

(21) Appl. No.: 10/438,772

(22) Filed: May 15, 2003

(65) Prior Publication Data

US 2004/0226521 A1 Nov. 18, 2004

(51) Int. Cl.$^7$ ................................................ F22B 37/42
(52) U.S. Cl. .................. 122/5.51; 122/14.1; 122/448.1
(58) Field of Search .............................. 122/4 A, 5.51, 122/13.3, 14.1, 448.1; 392/441, 463

(56) References Cited

U.S. PATENT DOCUMENTS

| | | | |
|---|---|---|---|
| 4,848,277 A | * | 7/1989 | Bommer .................. 122/20 B |
| 5,985,474 A | * | 11/1999 | Chen et al. ................. 429/17 |
| 6,401,669 B1 | * | 6/2002 | Macgowan et al. ....... 122/448.1 |
| 6,694,926 B2 | * | 2/2004 | Baese et al. ............... 122/14.2 |

* cited by examiner

Primary Examiner—Gregory Wilson
(74) Attorney, Agent, or Firm—Devine, Millimet, Branch; Paul C. Remms; Michelle Saquet Temple

(57) ABSTRACT

An air-proportionality type boiler is provided. Since the air-proportionality type boiler directly controls a current proportionality gas valve according to an amount of air by using a low-price AC air blower, a low-price current proportionality gas valve and a low-price airflow sensor, a gas supply amount can be adjusted with respect to all ranges of the airflow amount. Also, an appropriate calorie required for proportionally controlling a present circulation water temperature to a set temperature, can be supplied. The boiler can be safely ignited to perform a combustion operation under the optimal condition although abnormal weathers and conditions. Accordingly, since a combustion performance is enhanced, combustion efficiency is high and a fuel cost can be saved.

1 Claim, 3 Drawing Sheets

AIR-PROPORTIONALITY TYPE BOILER

BACKGROUND OF THE INVENTION

1. Field of the Invention

The present invention relates to an air-proportionality type boiler, and more particularly, to an air-proportionality type boiler which directly controls a current proportionality gas valve according to an amount of air by using a low-price AC air blower, a low-price current proportionality gas valve and a low-price airflow sensor, a gas supply amount can be adjusted with respect to all ranges of the airflow amount, with low-price equipment.

2. Description of the Related Art

A boiler for heating and supplying hot water for use in a general home is divided into an oil boiler and a gas boiler, according to a fuel used. Recently, the gas boiler is chiefly used since it raises less atmosphere pollution and can be conveniently used. A liquefied natural gas (LNG) is used as its fuel.

The gas boiler is divided into a condensing type and a non-condensing type according to a heat exchanger for heating circulation water. The condensing type gas boiler uses combustion heat to direct circulation water, and also re-absorb condensed latent heat of exhaust gas, to accordingly maximize a thermal efficiency.

A general condensing type gas boiler will be described below. In the general condensing type gas boiler, a burner is installed in the upper portion of the boiler, and thus gas mixed with air is ignited and burnt downwards. Fluid or circulation water is heated using high-temperature combustion gas, in a heat exchanger for heating which is installed in the lower portion of the boiler. The heated fluid or water is circulated into a bedroom, a living room, or a bathroom to perform a heating operation.

Also, at the time of a hot water operation, a three-way valve is operated to interrupt hot water which is supplied to a bedroom, a living room or a bathroom, and to shift it to hot water heat exchangers installed in parallel with one another, so as to be used as a heating source. When circulation water is supplied into and re-collected from the heat exchangers, the circulation water is heated to be used for wash or bath.

The gas boiler as constructed above can be divided into various types according to a control method or a sealing status. In particular, an air-proportionality type measures a pressure of externally inhaled air, and then supplies the burner with fuel in proportion to the measured air pressure. Accordingly, an accurate amount of fuel is supplied in proportion to the air pressure, with result a result that a combustion efficiency is heightened and noxious gas is suppressed at maximum, to thus prevent environmental pollution.

That is, since a factor of adjusting a gas supply amount is varied in dependence upon only an air pressure, a certain amount of gas is supplied with respect to a certain air pressure without separately controlling a proportional control portion of a gas valve, to thereby maintain a constant air-to-fuel ratio at all times. Accordingly, an accurate proportional control operation can be done differently from an on/off control type or a current proportionality type.

Korean Laid-open Patent Publication No. 10-2000-26741 on May 15, 2000 entitled "Air-proportionality type condensing boiler" was registered on Aug. 8, 2000 to the same applicant as that of this application.

FIG. 1 is a configurational view showing a general air-proportionality type condensing boiler, and FIG. 2 is a block diagram showing a general air-proportionality type condensing boiler.

First, as shown in FIG. 1, a condensing gas boiler is run by an air-proportionality type method of adjusting an air pressure in dependence upon a variation of an external atmosphere temperature so that a constant amount of air can be always supplied. The condensing gas boiler includes: a hermetical body 2 having an air inhale duct 3 for inhaling external air according to an operation of a DC (direct current) air blower 10 and an exhaust gas exit duct 20 for discharging combustion exhaust gas externally; a combustion chamber 4 having a burner 12 for burning a mixture of gas supplied via first and second electronic valves 46 and 46' and an air-proportionality valve 47 and air inhaled by the DC air blower 10, an actual heat unit heat exchanger 14 for heating circulation water, and a latent heat exchanger 16, integrally; a hot water heat exchanger 34 for heating supply water by the circulation water heated while passing through the actual heat unit heat exchanger 14; a circulation pump 22 for supplying the circulation water having passed through a circulation water filter 24 and an air/water separator 26, to the latent heat exchanger 16; and an expansion tank 48 for storing part of the circulation water which is input according to operations of a three-way valve 28 and an overpressure prevention valve 32.

Also, an air pressure detector 50 installed in an inhalation chamber 6, for detecting an air pressure of air inhaled by the DC air blower 10 is installed for air-proportionality. If a pressure recognizer 51 in the air-proportionality valve 47 recognizes the air pressure, a controller 40 controls a combustion chamber 4 in a boiler perform a combustion mode with injected gas based on the air pressure detected by the air pressure recognizer 51. Also, the controller 40 receives a temperature sensor signal and thus calculates a heat capacity with data indicating whether or not a present temperature reaches a set temperature by using the temperature sensor signal. Also, the controller 40 duty-controls a number of rotations of the DC air blower 10 and changes the air pressure with the number of rotations as many as necessary, to thereby adjust a gas discharging amount of the air-proportionality valve 47, and thus adjust a gas supply amount supplied to the burner 12.

In more detail, the burner 12 which burns gas with air inhaled via the inhalation chamber 6 according to operation of the DC air blower 10 is installed in the upper portion of a combustion chamber 4. The actual heat exchanger 14 and the latent heat exchanger 16 are disposed in turn below the burner 12. The actual heat exchanger 14 heats circulation water at the process where the actual heat generated in the burner contacts the circulation water directly. The latent heat exchanger 16 heats circulation water using latent heat generated at the time of thermally contacting the exhaust gas.

The exhaust gas having passed through the latent heat exchanger 16 is discharged externally via an exhaust gas duct 20 and condensed water generated at the time of heat exchanging is collected in an exhaust gas hood 18, to then be discharged externally. The circulation water is heated while having passed through the latent heat exchanger 16 and the actual heat exchanger 14 in turn according to operation of the circulation pump 22. The temperature of the heated circulation water is detected by a thermistor 52 and the detected temperature is sent to the controller 40.

The circulation pump 22 for circulating circulation water is disposed in the lower-left portion of the boiler. When the circulation pump 22 operates, the circulation water having finished indoor heating is sent to a circulation water filter 24 via a line L1. The circulation water filter 24 removes impurities included in the circulation water. The filtered circulation water is sent to an air/water separator 26 located above the circulation water filter. The air/water separator 26 discharges air included in the circulation water, via an upper air vent.

An overpressure prevention valve 32 for preventing the pressure of the circulation water from rising up excessively is installed between the circulation water filter 24 and the air/water separator 26, and sends part of the circulation water to an expansion tank 48 to thus adjust the pressure. The circulation water having passed through the air/water separator 24 is supplied to the latent heat exchanger 16 via a line L2 by operation of the circulation pump 22, and then is heated while passing through the actual heat exchanger 14, and is discharged via a line L3. The circulation water having passed through the line L3 is supplied indoors according to the operation of a three-way valve 28.

A heat exchanger, which obtains hot water by using heat of the circulation water, is disposed in the lower-middle portion of the boiler. Cold water having input via a line L6 according to operation of a hot water flow switch 36 is heated at the process of having passed through a hot water heat exchanger 34, and then discharged via a line L7. The hot water heat exchanger 34 in the present invention is of a parallel-type structure and sets a deviation range of a temperature to be controlled into a much smaller area in comparison with the conventional art. Accordingly, a driving area of the boiler is enhanced to thereby suppress noxious exhaust gas at maximum.

A gas supply unit is installed in the lower-right portion of the boiler. A number of rotations of the DC air blower 10 is duty-controlled according to first and second electronic valves 46 and 46' and the output signal of the DC air blower 10 transferred from the controller 40. At the same time, the gas input via a line L8 according to operation of the air-proportionality valve 47 which varies a gas supply amount is supplied to a nozzle 8 located above the combustion chamber 4 through a line L9. Here, the gas supply amount is varied according to the operation of the air-proportionality valve 47. Accordingly, the gas supply amount is compensated for in dependence upon variation of external air. The thus-supplied gas is ignited and burnt by a spark transferred via an ignition transformer 42 and an ignition rod. The above-described combustion process is controlled by the controller 40, which receives an input signal from an indoor temperature controller 38 manipulated by a user.

The operation of the air-proportionality type-condensing boiler will be described below with reference to FIG. 2.

The controller 40 receives various input signals such as the circulation water temperature detected by the thermistor 52, user's desired indoor temperature and operational time selected by a user, and calculates an amount of fuel based on an optimal air-to-fuel ratio, as well as the various input signals. Then, the controller 40 sends a signal to an endless control DC air blower 10 to perform a duty control, based on the calculated fuel supply amount and thus optimally controls an amount of fuel supplied to the burner 12 according to change of an air pressure. The controller 40 sends a signal to the first and second electronic valves 46 and 46' and the ignition transformer 42, respectively, in addition to the DC air blower 10, to thereby enable the boiler to operate normally.

As described above, the air-proportionality type boiler calculates a calorie and then duty-controls the rotational number of the DC air blower 10, to thereby change an air pressure with the rotational number as many as necessary. As a result, the gas discharging amount of the air-proportionality valve 47 is adjusted according to the change of the air pressure, to thus adjust the gas supply amount to be supplied to the burner 12.

In the case that a burner is controlled according to a temperature by using an AC air blower and a current proportionality gas valve and an air pressure sensor in the prior art, an airflow amount to be supplied to a combustion chamber cannot be seen. Accordingly, in the case that a counter-wind is blown or an exhaust gas passage is clogged, that is, under an abnormal condition, an airflow amount does not match a gas supply amount in view of its ratio. At the time of firing, noise and an explosive fire may be caused or a non-fire may occur. Also, noise and an accidental fire may occur during combustion. In order to solve these problems an air-proportionality valve has been used as a gas valve and since the air-proportionality valve requires high pressure, a DC blower has been used.

However, in the case that the DC air blower and the air-proportionality valve have been used, a product cost increases, and a gas supply amount set in the air-proportionality valve 40 does not match all kinds of the airflow amount. As a result, since an error may occur, the product is not practical and efficiency is lowered, when considering the price of the product.

Also, since an expansive DC air blower is used, the price of the water heater increases.

SUMMARY OF THE INVENTION

To solve the above problems, it is an object-of the present invention to provide an air-proportionality type water heater which can control all ranges of an airflow amount efficiently by using low-price equipment, in which a low-price AC air blower, a low-price current proportionality gas valve and a airflow sensor are used and thus the current proportionality gas valve is directly controlled.

To accomplish the above object of the present invention, there is provided an air-proportionality type boiler for controlling an amount of fuel to be supplied according to an amount of inhaled air, the air-proportionality type boiler comprising: an AC air blower for inhaling air via an inhalation air duct; an airflow sensor installed in an inhalation chamber, for measuring an amount of air to be inhaled by the AC air blower; a current proportionality gas valve for adjusting an amount of gas to be supplied; and a controller for controlling a rotational speed (round per minute; RPM) of the AC air blower according to a calorie and the current proportionality gas valve according to the amount of air measured in the airflow sensor.

BRIEF DESCRIPTION OF THE DRAWINGS

The above object and other advantages of the present invention will become more apparent by describing the preferred embodiment thereof in more detail with reference to the accompanying drawings in which.

DETAILED DESCRIPTION OF THE INVENTION

Figure 1:
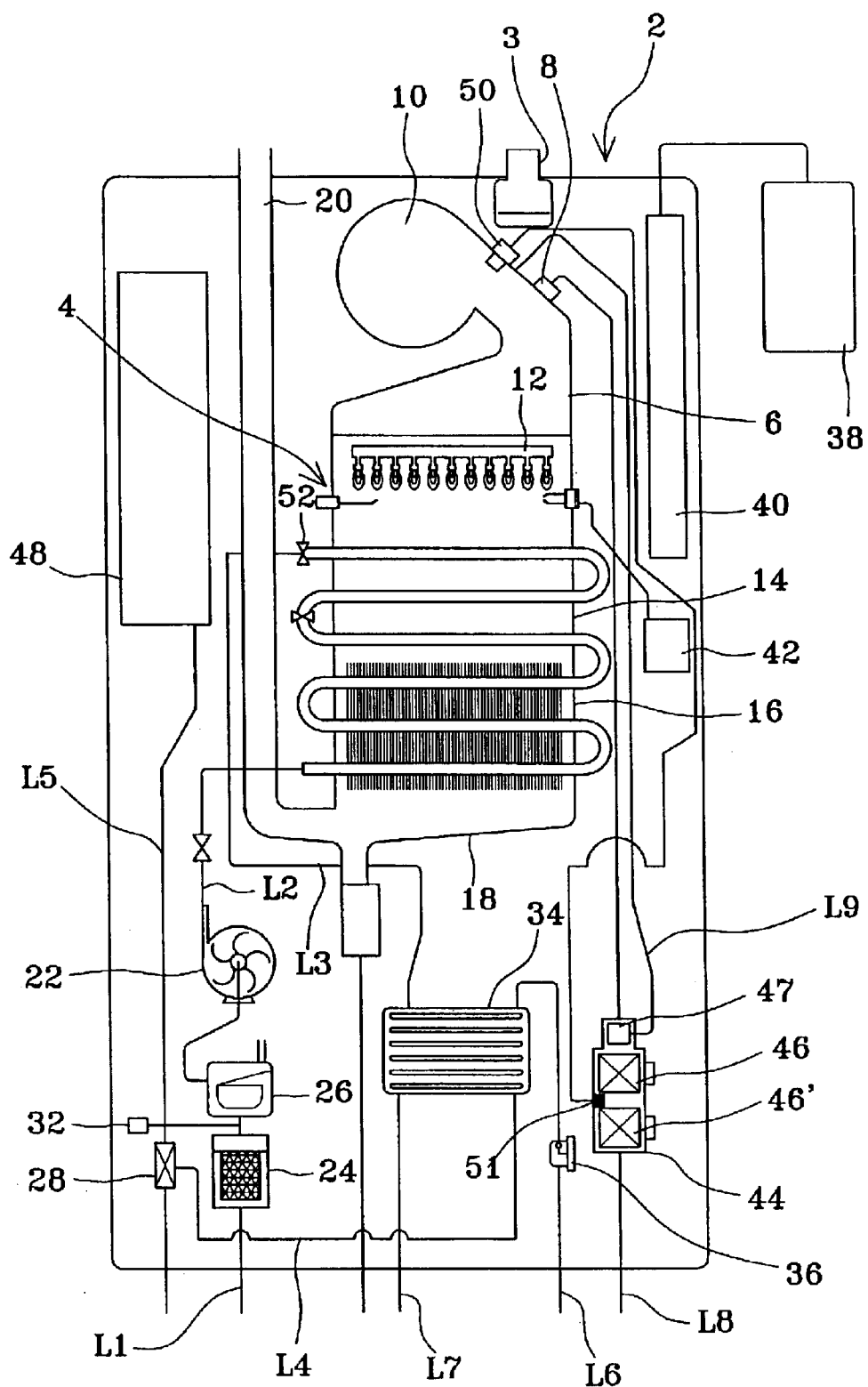
FIG. 1 is a configurational view showing a general air-proportionality type condensing boiler.
Figure 2:
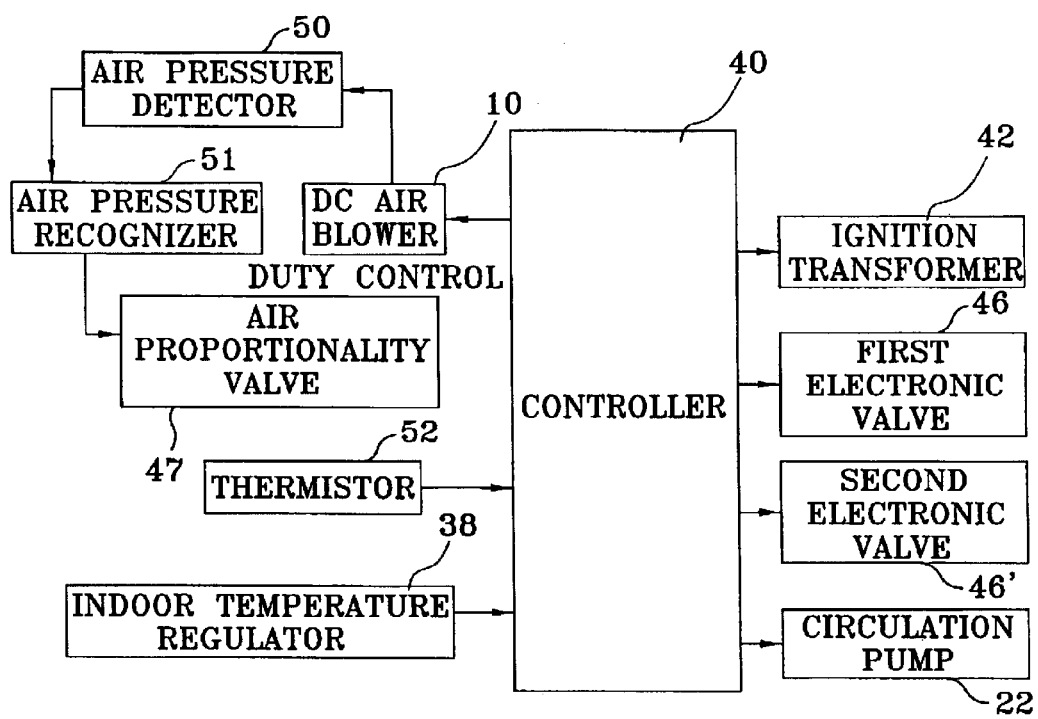
FIG. 2 is a block diagram showing a general air-proportionality type condensing boiler.

A function of an air-proportionality type boiler according to the present invention will be described.

A controller calculates a calorie and then controls a rotational number (RPM) of an AC air blower. As a result, if an amount of air to be inhaled is varied as many as the rotational number needed, an airflow sensor senses the variation in the airflow amount, and converts the airflow amount variation into an appropriate amount of gas which is currently needed, to thereby control a current proportionality gas valve. Thus, an amount of gas can be adjusted over all ranges of an airflow amount.

A preferred embodiment of the present invention will be described with reference to the accompanying drawing. Also, this embodiment does not restrict a technical scope of the present invention but is illustrated as only an example. The same elements as those of the conventional art are assigned by the same reference numerals and designations as those of the conventional art.

Figure 3:
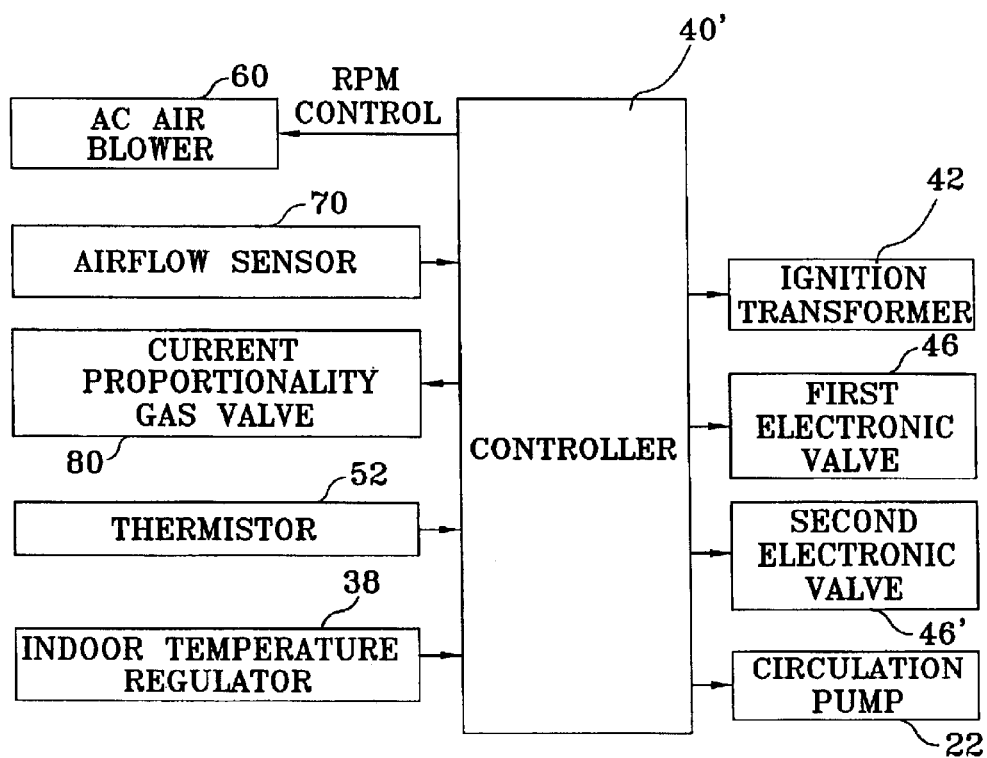
FIG. 3 is a block diagram showing a configuration for explaining an air-proportionality type condensing boiler according to the present invention.

FIG. 3 is a block diagram showing a configuration for explaining an air-proportionality type boiler according to the present invention.

As shown in FIG. 3, the air-proportionality type boiler includes: an AC air blower 60 for inhaling air via an inhalation air duct 3; an airflow sensor 70 installed in an inhalation chamber 6, for measuring an amount of air to be inhaled by the AC air blower 60; a current proportionality gas valve 80 for adjusting an amount of gas to be supplied; a thermistor 52 for sensing temperature of circulation water; an indoor temperature regulator 38 for manipulating a series of combustion processes by a user, an ignition transformer 42 for generating a spark to the supplied gas to ignite the gas; a circulation pump 22 for circulating circulation water; first and second electronic valves 46 and 46' for adjusting an amount of fuel to be supplied; and a controller 40' for calculating an optimal caloric based on temperature of the circulation water sensed by the thermistor 52 and various input signals from the indoor temperature regulator 38 selected by a user, and controlling a rotational speed (round per minute; RPM) of the AC air blower 60 according to the calorie, and activating the ignition transformer 42 and the first and second electronic valves 46 and 46' according to the amount of air measured in the airflow sensor 70, and then controlling the current proportionality gas valve 80.

Thus, if a user operates a boiler via the indoor temperature regulator 38 for a heating purpose, the controller 40' turns the circulation pump 22 and the air blower 10 on. Then, an airflow amount supplied to the combustion chamber is detected by the airflow sensor 70, and then a rotational number (round per minute; RPM) of the AC air blower 60 is controlled so that the airflow amount becomes an amount necessary for ignition. If the airflow amount becomes an appropriate airflow amount, the ignition transformer 42 is turned on. Then, an airflow amount necessary for ignition is maintained for a certain time and then the first and second electronic valves 46 and 46' are opened so that gas is supplied as much as an amount of gas necessary for the current airflow amount. Then, if the gas is ignited, the ignition transformer 42 is turned off to start a heating operation.

As described above, the controller 40' ignites the boiler, and calculates a calorie needed with a proportionality formula so that a current circulation water temperature is proportionally controlled according to a circulation water temperature set based on the circulation water temperature detected by the thermistor 52. Then, the controller 40' coverts the calorie into the RPM value of the AC air blower 60 and controls the AC air blower 60 with the calorie. A gas amount is determined by converting the airflow amount detected by the airflow sensor 70 into an appropriate amount of gas needed by the burner 12. The current proportionality gas valve 80 is controlled based on the appropriate gas amount, to thereby control an amount of gas.

As described above, the air-proportionality type boiler according to the present invention using a low-price AC air blower, a low-price current proportionality gas valve, and a low-price airflow sensor, to then directly control the current proportionality gas valve according to an airflow amount. Accordingly, an amount of gas can be controlled with respect to all ranges of an airflow amount. Thus, a calorie appropriate for proportionally controlling the current circulation water temperature with respect to the set temperature can be supplied. Since the boiler can perform an ignition and combustion operation optimally and safely, even under the abnormal weather or condition, a combustion performance is improved, to thereby enhance combustion efficiency and save a fuel cost.

Also, since the low-price AC air blower and the low-price current proportionality gas valve are used, an air-proportionality type boiler can be provided in a cheaper price and then used safely and conveniently.

The present invention is not limited in the above-described embodiment. It is apparent to one who is skilled in the art that there are many variations and modifications without departing off the spirit of the present invention and the scope of the appended claims.

What is claimed is:

1. An air-proportionality type boiler for controlling an amount of fuel to be supplied according to an amount of inhaled air, the air-proportionality type boiler comprising:

an AC air blower for inhaling air via an inhalation air duct;

an airflow sensor installed in an inhalation chamber, for measuring an amount of air to be inhaled by the AC air blower;

a current proportionality gas valve for adjusting an amount of gas to be supplied; and a controller for controlling a rotational speed (round per minute; RPM) of the AC air blower according to a caloric and the current proportionality gas valve according to the airflow amount measured in the airflow sensor.

* * * * *